(12) United States Patent
Serwin

(10) Patent No.: US 7,600,943 B2
(45) Date of Patent: Oct. 13, 2009

(54) ULTRA HIGH STRENGTH ASPHALT

(75) Inventor: Bo Serwin, Højbjerg (DK)

(73) Assignee: Serwin Holding ApS, Hojbjerg (DK)

( * ) Notice: Subject to any disclaimer, the term of this patent is extended or adjusted under 35 U.S.C. 154(b) by 0 days.

(21) Appl. No.: 11/795,181

(22) PCT Filed: Jan. 13, 2006

(86) PCT No.: PCT/DK2006/000022

§ 371 (c)(1),
(2), (4) Date: Sep. 24, 2007

(87) PCT Pub. No.: WO2006/074662

PCT Pub. Date: Jul. 20, 2006

(65) Prior Publication Data

US 2008/0118637 A1 May 22, 2008

(30) Foreign Application Priority Data

Jan. 13, 2005 (DK) .......................... PA 2005 00071

(51) Int. Cl.
*E01C 11/00* (2006.01)
*E01C 7/26* (2006.01)
(52) U.S. Cl. .......................................... 404/72; 404/17
(58) Field of Classification Search .................. 404/72, 404/77, 79, 17
See application file for complete search history.

(56) References Cited

U.S. PATENT DOCUMENTS

| 2,978,351 | A | | 4/1961 | McConnaughay |
| 3,713,856 | A | | 1/1973 | Pullar |
| 4,025,683 | A | * | 5/1977 | Meader et al. ............... 428/215 |
| 6,228,907 | B1 | * | 5/2001 | Cummings et al. .......... 523/420 |
| 6,454,889 | B1 | * | 9/2002 | Hendrix et al. ............... 156/71 |
| 2003/0150364 | A1 | * | 8/2003 | Orange et al. ............... 106/802 |

FOREIGN PATENT DOCUMENTS

| DE | 609740 | 1/1935 |
| DE | 4238307 | 5/1994 |
| DE | 9410620 | 10/1994 |
| DE | 19514809 | 10/1996 |
| GB | 19639 | 8/1913 |
| GB | 2053329 | 2/1981 |
| WO | WO 98/44046 | 10/1998 |

* cited by examiner

*Primary Examiner*—Raymond W Addie
(74) *Attorney, Agent, or Firm*—James Creighton Wray; Meera P. Narasimhan

(57) ABSTRACT

The present invention relates to method for the preparation of a dry material for use as an ultra high strength pavement as well as the dry granular pavement material manu-factured by the method, and furthermore the present invention also relates to a method for applying the ultra high strength pavement monolithic or to a subgrade.

14 Claims, 2 Drawing Sheets

ULTRA HIGH STRENGTH ASPHALT

This application claims the benefit of Danish Application No. PA 2005 00071 filed Jan. 13, 2005 and PCT/DK/2006/000022 filed Jan. 13, 2006 which are hereby incorporated by reference in their entirety.

BACKGROUND OF THE INVENTION

The present invention relates to method for the preparation of a dry material for use as an ultra high strength pavement as well as the dry granular pavement material manufactured by the method, and furthermore the present invention also relates to a method for applying the ultra high strength pavement monolithic or to a subgrade.

In the art, it is well-known to combine bituminous asphalt with a cement slurry. This is traditionally done by applying the asphalt to the subgrade by normal asphalt paver and thereafter by different means allowing a cement slurry to enter and fill the voids in the asphalt layer. In this manner, a ductile and strong wear resistant pavement layer is established, which to a certain degree benefits from both the advantages provided by the relatively soft and flexible asphalt, and the strength characteristics of the cement based slurry, which is provided in the voids in the asphalt layer.

Such pavement systems are sold commercially, for example under the name "Densifalt" by the Danish corporation Densit A/S or "Confalt" by the Danish corporation Contec ApS.

One problem with the prior art systems is the fact that they are quite labour intensive in that they require firstly that the asphalt is applied, for example by a normal asphalt paver, and after the asphalt has cooled down sufficiently, the slurry, based on a binder-water mix where the binder may comprise cement, silica, fly ash and other constituents, is placed manually or by other suitable means. The slurry, which may be an ultra high strength concrete, is thereafter allowed to cure, and finally the pavement may be used.

In addition to being labour intensive, the process is also relatively time consuming in that the curing and cooling of the asphalt layer is necessary such that as the slurry is added, undesirable chemical reactions in the slurry may be delayed sufficiently in order for the slurry to reach and be distributed in the asphalt matrix sufficiently in order to provide a substantially complete filling of the voids in the asphalt layer by the slurry materials. If the asphalt is too hot, the chemical reactions particularly the chemical reactions between the water and the binder in the slurry may be accelerated such that the slurry will harden, and thereby loose viscosity, and also hinder further ingress of slurry into the deeper voids in the asphalt layer. It is well know within the technical field of hardening cement based materials, that it should be avoided to allow the cement to harden at too high temperatures as this will cause uneven and undesirable hardening in the cement-based matrix.

From WO98/44046 an asphaltic road surfacing composition is known, which composition comprises aggregate, bitumen, cellulose fibres and filler. In one embodiment cement is mentioned as a possible filler material, without stating the advantages obtainable by adding a limited amount of cement to the composition. The road surfacing material is hot mixed at a temperature of from 150° C. to 190° C. The road surfacing material is placed by a method wherein the composition is at a temperature from 80 to 90° C.

Hot mixing is a well known method used within asphalt production and the laying temperatures stated in the prior art document also corresponds to the normal temperatures when laying asphalt pavements. The advantages which could have been attained by adding cement to the composition, appears to be lost, due to the high temperatures at which the composition is mixed and applied, such that the binder characteristics of cement will not be effective in the resulting pavement layer, but solely the filler function of the cement content is utilised.

OBJECT OF THE INVENTION

The object of the present invention is therefore to provide a manufacturing method for a material which may be spread on a surface such that the drawbacks of the prior art methods are alleviated.

DESCRIPTION OF THE INVENTION

The present invention addresses this problem firstly by providing a method for the preparation of dry material for use as ultra high strength asphalt, such that during application only water needs to be added to the dry material, where the method comprises the following steps:
  drying and heating stone and sand aggregates;
  mixing the aggregates with hot bitumen creating a hot mix;
  adding binder and optionally further additives to the hot mix until the bitumen covered aggregates are not sticky, where the hot mix is maintained at a temperature above 40° C.;
  storing the hot mix and letting the mix cool, such that it is stored below 40° C.

By preparing the material according to the method mentioned above, the drying and heating of stone and sand aggregates as well as mixing the aggregates with hot bitumen, creating a hot mix substantially corresponding to the method of preparing a regular asphalt mix. The following step of adding the binder, and optionally other additives, to the hot mix will cover all the bitumen covered aggregates, which will be comparable to granules, with a dusting of the binder. The dusting may be controlled simply by adding more or less binder and other additives to the hot mix. When all particles, i.e. the sand and stones constituting the aggregates, in the mixing vessel have been covered by a dusting of binder, and optionally further additives such that the particles do not stick together, the hot mix is stored and allowed to cool. As the bitumen is kept below 40° C., the stickiness of the bitumen is less such that it is assured that the binder covered separate particles will not "melt" together during storage.

In a further advantageous embodiment the binder is an ultra high performance binder, and further said ultra high performance concrete binder may comprise cement, silica, fly ash, slag ash and other suitable very fine particles which may have strength creating characteristics.

By the formulation ultra high performance concrete binders is to be understood the binders used for creating ultra high strength concretes, where the compressive strength typically is a factor 10 stronger than regular concretes, i.e. for some ultra high performance concretes the compressive strength is above 400 MPa. These strengths are achieved by using special mixes regarding aggregates, cement and further additives. By grading the additives, the cement and the fine particles, it is possible to create an immensely dense structure. Furthermore, the use of micro silica is extremely packable such that even small voids between the aggregates and the cement particles may be filled with micro silica, or finer particles. Furthermore, micro silica will, when it reacts with water, develop a very strong structure, which will give the overall structure added strength.

In a further advantageous embodiment, the further additives which may be added to the hot mix along with the binder may be selected among sand, cement, stones, plasticizers, super-plasticizers, water reducing agents, air increasing or decreasing agents, silica, slag ash, fly ash, latex, acrylic or other polymer types, Perlite, Vermiculite, Leca granules. By adding selected materials to the hot mix, the properties of the finished pavement may be designed according to the special purpose of that particular pavement.

In a further advantageous embodiment, reinforcement fibres are added to the mix after the binder and bitumen covered aggregates have obtained their non sticky characteristics. As the voids in the asphalt layer in the finished structure will be filled with the ultra high performance concrete binder based slurry, the provided fibres in this slurry will increase the ductility and the integrity of the ultra high performance concrete binder based slurry portion of the finished pavement structure. As the fibres are added after the bitumen is completely covered with the binder, the fibres will be substantially loose in the finished dry mix.

The invention also relates to the material per se in that a dry granulate pavement material manufactured to any of the advantageous embodiments listed above is also comprised within the present patent.

Use of the inventive and novel dry granular pavement material is also encompassed in the present application. Therefore, the present application also concerns a method for applying an ultra high strength asphalt pavement to a subgrade, wherein a dry granular material according to claim 4 is used, where the method comprises the following steps:

mixing the granular pavement material with water in order to create a castable pavement mix;
laying, spreading and levelling the pavement mix;
levelling and compacting the pavement mix;
hardening and curing the pavement mix.

As a dry granular material is used, it is easy to store and transport this material such that preparation of the material, i.e. turning the dry granular material into a castable pavement mix, may take place at any appropriate site. Once water is added to the dry granular pavement material, the material will become castable, i.e. become comparable in consistency to regular concrete. Depending on the plasticizers, the amount of binder and the amount of water, the viscosity of the castable pavement mix may be adjusted within wide limits. Also, depending on the viscosity of the castable pavement mix, different methods may be used in order to lay, spread and level the pavement mix. Where very fluid pavement mixes are desired, the laying, spreading and levelling may be performed manually, or in certain instances the pavement mix will be so fluid that it will be almost self-levelling.

In other instances, it is necessary to physically work the pavement mix such that machinery may be used in order to lay, spread and level the pavement mix. For the same type of materials, compacting of the pavement mix may be carried out by any conventional means, and after the mix has been levelled and compacted, steps shall be taken comparable to the steps necessary in order to cure concrete, such that the finished pavement mix which has been layered, spread, levelled and compacted is left to harden and cure under controlled circumstances in order to achieve the best quality pavement possible.

In a further advantageous embodiment of the method for applying the ultra high strength asphalt pavement to a subgrade, the step of mixing the dry granular material with water is carried out by one of the following means:

a concrete batching plant;
a small drum mixer;
a free fall mixer;
a pan type mixer;
a concrete batching truck, or other suitable conventional concrete mixing facility.

Although these means may appear conventional when thinking about concrete, it is a great advantage with the method for applying an ultra high strength asphalt pavement that conventional means may be used in order to mix an bituminous pavement structure in that such equipment is well-known and widespread, and therefore does not require specialists or especially constructed equipment, but the method may be carried out in a substantially well-known manner.

This is also reflected in the following advantageous embodiment where the step of laying, spreading and levelling of the pavement mix may be carried out by one of the following means:

an asphalt paver;
a concrete paver;
vibrating equipment;
straight edges and manual working.

As the mixture is both an asphalt pavement and a concrete pavement, paving machines for laying these types of materials may be used when the viscosity of the material is such that it is suitable for using any of these types of pavers. The levelling is partly carried out by the pavers, but may additionally be carried out by using traditional vibrating equipment in that the ultra high strength binder slurry will exhibit the same floating capabilities as ordinary concrete when exposed to vibrations. Furthermore, the levelling may be carried out by the old-fashioned manner of using straight edges and manual workings.

The step of levelling and compacting the pavement mix may also, in a further advantageous embodiment, be carried out by one of the following means:

rollers;
power floats or manual floats;
trowelling;
other methods, such that the surface is rendered smooth or with a skid resistant structure.

Also, the step of hardening and curing the pavement mix may include one or more of the following:

applying a liquid curing membrane to the top surface of the pavement;
applying a curing foil or membrane;
applying heat to the pavement structure during the hardening.

True for these embodiments as well as the embodiments listed above, the characteristics of the castable pavement mix is such that traditional equipment used for either casting concrete or laying asphalt may be utilized in connection with the novel and inventive pavement mix according to the present invention. The characteristics of the pavement mix may be adjusted by adding different additives, water, amounts of sand, stones and the like such that the skilled person will choose the most suitable means for applying, levelling, compacting and so fourth in view of the consistency and the properties of the pavement mix which is to be worked on.

In a further advantageous embodiment, one or more reinforcement layers are arranged on the subgrade before the laying of the castable pavement mix such that the reinforcement will be arranged in the finished pavement layer. This additional method step utilises the fact that the ultra high strength binder material which is present between the bitumen covered sand and stone particles will achieve such a strength that it is possible to utilise reinforcement placed in the pavement material layer such that the pavement layer will be able to exhibit constructional properties thereby also utilising the layer's load transferring capabilities. The load transferring capabilities are greatly improved when tensile forces may be transferred to reinforcements especially designed for assimilating this type of stresses.

In order to provide extra ductility in the pavement structure, fibre reinforcement is added during the mixing, i.e. when water is added to the dry mix to the pavement layer arranged on the subgrade before the laying of the castable pavement mix.

In the prior art methods, the asphalt layer is usually placed whereafter the binder-containing material in the form of slurry is spread and worked into the asphalt layer, whereby the binder-containing slurry substantially fills more or less of the voids in the asphalt layer. With the present invention, however, where the slurry/mortar is an integral part, and in intimate contact with the bitumen and asphalt particles, there will be no voids, but the space between separate aggregate particles of the asphalt will be filled with the integral mortar.

In summary, a number of advantages are achieved with the present novel and inventive method for the preparation of a dry material as well as the dry material per se, and the method of applying an ultra high strength pavement to a subgrade. Among the advantages may be mentioned that a very high compressing strength and bending tensile strength may be achieved in comparison to that of traditional asphalt, or the prior art methods mentioned above where a two-step procedure was used in order to apply a binder containing slurry to the asphalt part, where a semi-flexible topping is achieved.

Furthermore, very high flexibility in comparison to traditional concrete or cement based mixes is achieved in that in particular the provision of the bitumen allows for relatively large movements before the pavement breaks. Moreover, it is possible to adjust the modulus of elasticity according to the specific needs. For example by providing a higher amount of ultra high performance concrete binder materials to the mix, a higher modulus of elasticity will be achieved. On the other hand, providing a higher amount of bitumen will produce a pavement material having a lower modulus of elasticity.

In traditional concrete structures, it is necessary to provide dilatation joints as well as reinforcement in order to distribute the cracks, whereas with the present pavements the ultra high strength asphalt (UHSA) may be used for pavements without providing dilation joints such that no cracks and no joints are necessary, and still the need for reinforcing mats, reinforcement or fibres is not necessary due to the fact that the combination of bitumen and the ultra high strength concrete will provide such a ductility to the pavement that no cracks will occur. This is also achieved due to the fact that the creep forces in the UHSA is substantially reduced in that the forces arising with shrinkage and creep do not have to be transferred over long distances, but may be assimilated in the interface between the bitumen and the binders.

The special properties of the UHSA is the fact that all aggregates like fillers, sand and stones are covered by a thin or thick layer of bitumen, depending on the wanted properties. The thickness of the layer is determined in the initial stages of preparing the mix after the stone and sand aggregates have been heated, and the bitumen is applied. The characteristics may also be controlled by applying a thin or thick layer (dusting) of dry ultra high strength binder on all bituminised surfaces on all aggregates and fillers in the mixing vessel. In this manner, when water is added the final pavement structure will have a larger or smaller concrete content depending on the thickness of the binder layer applied to the aggregates.

As explained above, the surface of the bitumen covered aggregates is dry in that the bitumen is completely covered with dry substances such as binders, sand and the like, whereby it may be stored without loosing its properties. Only when the mix is mixed with water will it become wet and castable, and exhibit the combined characteristics of both the concrete portion and the asphalt portion.

Initial test with the system have indicated that the compressive strength of the UHSA may be adjusted such that the compressive strength may be in the range from 3-65 N/mm$^2$ depending on the recipe and mix design. Below, some examples of mix designs within this range are given.

The further advantage of the UHSA is the fact that it may be used for constructional purposes as explained above, unlike traditional asphalt or bituminous products.

Examples of Recipes

Recipe 1:

| | |
|---|---|
| 28.00% | Silica sand 0-4 mm |
| 17.00% | Aggregates 5-8 mm |
| 24.00% | Aggregates 8-16 mm |
| 5.40% | Bitumen B60 |
| 2.60% | Filler |
| 23.00% | Binder |
| 100.00% | Ultra High strength Asphalt |
| 30.00% | Water of the Binder |

Recipe 2:

| | |
|---|---|
| 72.30% | Aggregates 5-11 mm |
| 3.30% | Bitumen B90 |
| 3.00% | Filler |
| 13.10% | Binder |
| 8.30% | Silica sand 0-2 mm |
| 100.00% | Ultra High strength Asphalt |
| 30.00% | Water of the Binder |

Recipe 3:

| | |
|---|---|
| 54.00% | Aggregates 8-11 mm |
| 2.40% | Bitumen B60 |
| 3.60% | Filler |
| 15.00% | Binder |
| 25.00% | Silica sand 0-4 mm |
| 100.00% | Ultra High strength Asphalt |
| 30.00% | Water of the Binder |

Recipe 4:

| | |
|---|---|
| 46.30% | Aggregates 11-16 mm |
| 2.05% | Bitumen B60 |
| 0.10% | Cellulose fibers |
| 3.15% | Filler |
| 17.10% | Binder |
| 31.40% | Silica sand 0-4 mm |
| 100.00% | Ultra High strength Asphalt |
| 30.00% | Water of the Binder |

The compressive strength of tests done with the above recipes proved that an increase in the Bitumen content decreased the strength and Modulus of Elasticity as well as an increased amount of Binder increased the compressive strength and Modulus of Elasticity. The Bitumen used was traditional hot bitumen and the Binder was a high strength cement based binder.

All percentages are based on weight.

All laboratory tests were carried out mixing bitumen and aggregates or bitumen, aggregates and silica sand at 100° C. and adding the dry binder into the hot mix above 60° C. After cooling down to less than 40° C. the total mix was mixed with water and cast for testing purposes.

In further tests different mixes according to the recipes above were mixed and stored outdoors at ambient temperatures. In September-October the temperatures ranged between 2° C. and 18° C. The mixes were shielded from direct sun and rain exposure during storage. After having been stored outside for a minimum of 14 days, the mixes were introduced into a traditional paver, and spread on a test field, on which test field a standard road subgrade had been prepared.

After having placed the mixes water was allowed to penetrate the voids in the pavements. A curing membrane (plastic foil) was applied to approx. half the area of each test area, whereas the other half was left uncovered.

The test areas were left to harden, and every 6 hours test samples (test cores) were taken from each half of each test field. The samples were visibly inspected and compared to samples from traditional semi-flexible pavements in order to evaluate integrity, void and aggregate distribution, and finally the bending-compression strength was determined. The results showed that there were no significant differences between covered and uncovered test fields, and that the strength development was comparable to traditionally placed semi-flexible pavements. Slightly higher compression strengths were registered as compared to traditional semi-flexible pavements having corresponding compositions.

On this background it was concluded that no disadvantages in relation to the finished pavement structure were detectable by using the new and inventive compositions and methods.

DETAILED DESCRIPTION OF THE INVENTION

Figure 1:
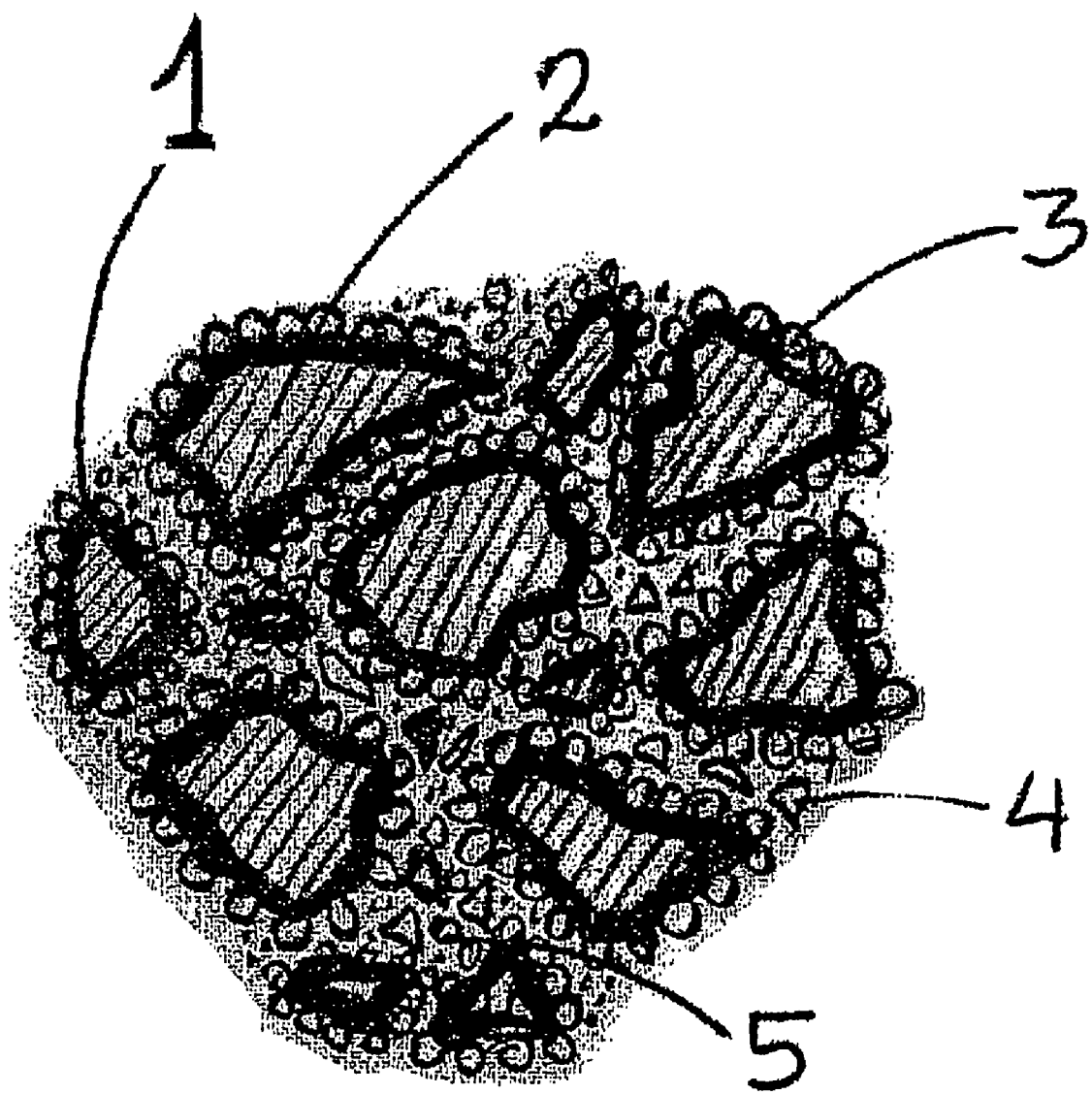
FIG. 1 illustrates the composite system
Figure 2:
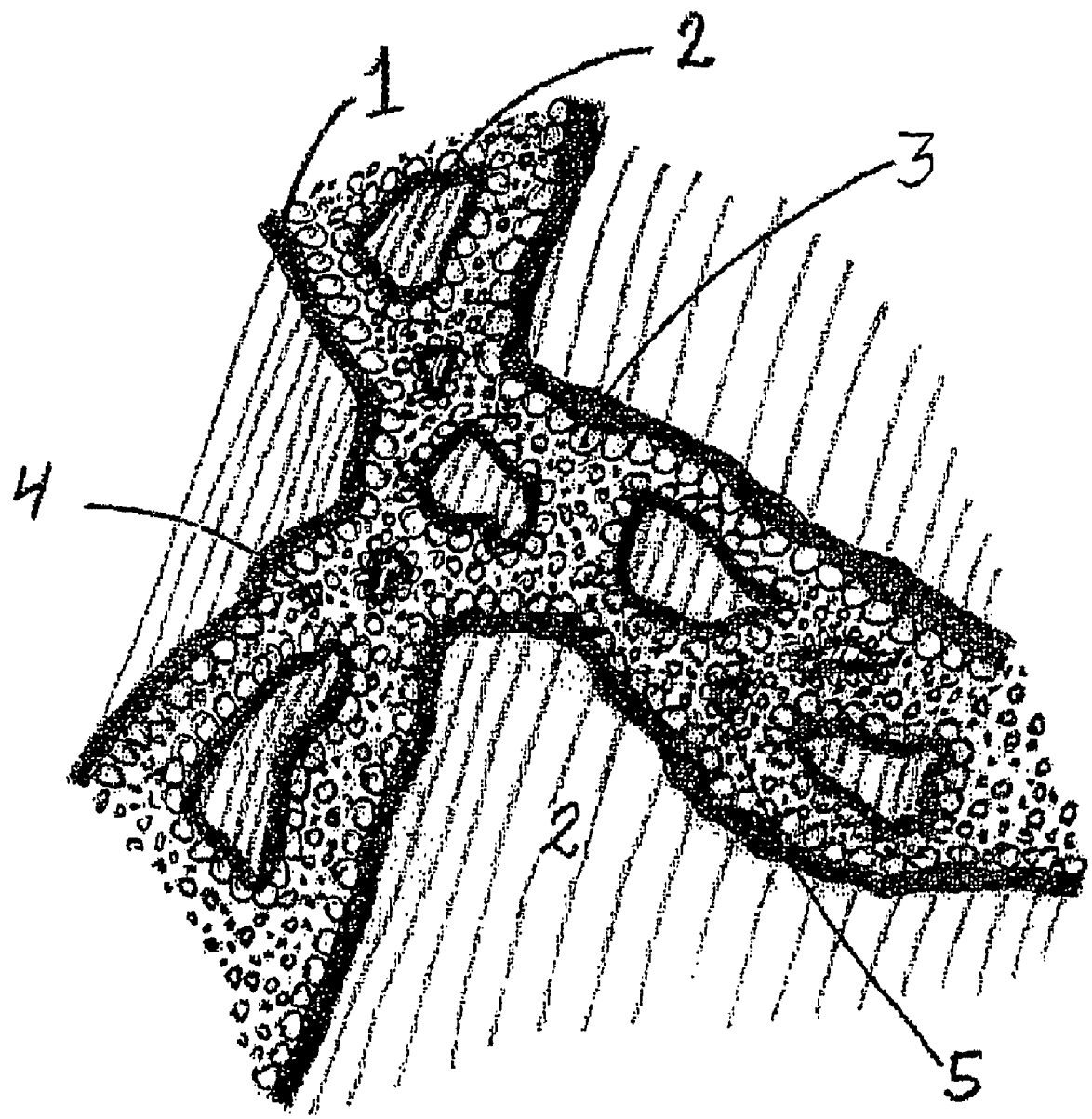
FIG. 2 illustrates a detail of FIG. 1.

In FIGS. 1 and 2 is illustrated a cross-section through a mix of particles where, in the example, aggregates in the shape of stones 2 are covered by a bituminous layer 1. Due to the sticky consistency of the bituminous layer 1, it will adhere to the stone or sand aggregate 2, and when a dry binder, for example in the shape of cement and/or micro silica, is added, the binder will when applied in sufficient amounts cover the entire surface of the bitumen covered particles 1,2 as illustrated by 3. Smaller particles between the larger aggregates may either be covered by a bituminous layer or dry binder in the spaces between the larger aggregates, depending on the time of adding these particles to the mixing process. When mixing together with the hot bitumen, they are covered by a bituminous layer, adding together with the binder they are covered with a dry powder.

FIG. 2 is a close-up of FIG. 1 showing the detailed system of bitumen 1 covering the aggregates, and the binder 3 covered bitumen, and smaller sand and aggregates 4 between the larger aggregates 2. A small bitumen covered aggregate 5 is mixed in between the binder 3.

The invention claimed is:

1. Method for the preparation of dry material for use as ultra high strength asphalt, such that during application only water needs to be added to the dry material, where the method comprises the following steps:
    drying and heating stone and sand aggregates;
    mixing the aggregates with hot bitumen creating a hot mix;
    adding a cement or cementitious binder and optionally further additives to the hot mix until the bitumen covered aggregates are not sticky, where the hot mix is maintained at a temperature above 40° C.;
    storing the hot mix and letting the mix cool, such that it is stored below 40° C.;
    whereby during application only water needs to be added to the dry material to activate the binder and thereby create a high strength asphalt layer.

2. Method according to claim 1, wherein the cement or cementitious binder is an ultra high performance concrete binder wherein said ultra high performance concrete binder further comprises cement, micro silica, fly ash, or slag ash.

3. Method according to claim 1 wherein the further additives may be selected among: sand, cement, stones, plastifiers, super-plastifiers, water reducing agents, air increasing or decreasing agents, silica, slag ash, fly ash, latex, acrylic or other polymers, Perlite, Vermiculite, Leca granules.

4. Method according to claim 1 wherein reinforcement fibres are added to the mix after the binder and bitumen covered aggregates have obtained their non sticky characteristics.

5. Method for applying an ultra high strength asphalt pavement to a subgrade, wherein a dry granular material according to claim 4 is used, where the method comprises the following steps:
    mixing the granular pavement material with water in order to create a castable pavement mix;
    laying, spreading and levelling the pavement mix;
    levelling and compacting the pavement mix;
    hardening and curing the pavement mix.

6. Method according to claim 5 wherein the step of mixing the dry granular material with water is carried out by one of the following means:
    a concrete batching plant;
    a small drum mixer;
    a free fall mixer;
    a pan type mixer;
    a concrete batching truck,
or other suitable conventional concrete mixing facility.

7. Method according to claim 5 wherein the step of laying, spreading and levelling of the pavement mix may be carried out by one of the following means:
    an asphalt paver;
    a concrete paver;
    vibrating equipment;
    straight edges and manual working.

8. Method according to claim 5 wherein the step of levelling and compacting the pavement mix is carried out by one of the following means:
    rollers;
    power or manual floats;
    trowelling;
    other methods,
such that the surface is rendered smooth or with a skid resistant structure.

9. Method according to claim 5 wherein the step of hardening and curing the pavement mix may include one or more of the following:

applying a liquid curing membrane to the top surface of the pavement;

applying a curing foil or membrane;

applying heat to the pavement structure during the hardening.

10. Method according to claim 5 where a fibre reinforcement is added to layers arranged on the subgrade before the laying of the castable pavement mix such that the reinforcement will be arranged in the finished pavement layer.

11. Method according to claim 5 wherein one or more reinforcement layers axe arranged on the subgrade before the laying of the castable pavement mix such that the reinforcement will be arranged in the finished pavement layer.

12. Method according to claim 11, wherein the reinforcement may be selected from steel bars, steel mesh, carbon wires or mesh, fibre strands or meshes, where the materials are selected among carbon, glass, plastics.

13. Dry granular material comprising a dry stone and sand aggregate material which aggregate material is covered by a bitumen layer, and furthermore that the bitumen layer is covered by a binder such that the stone and sand aggregate material is not sticky, wherein the binder is cement or a cementitious binder, whereby during application only water needs to be added to the dry material.

14. Dry granular material according to claim 13, wherein the binder is an ultra high performance concrete binder.

\* \* \* \* \*